Feb. 20, 1940.  W. H. LONGABAUGH  2,191,023
PISTON RING
Filed June 16, 1937
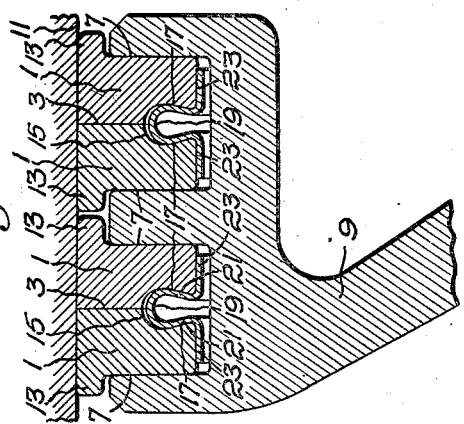
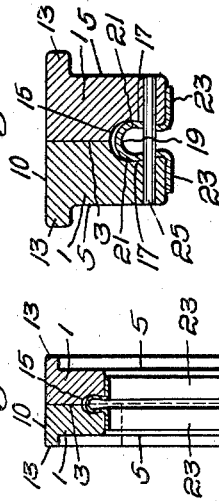
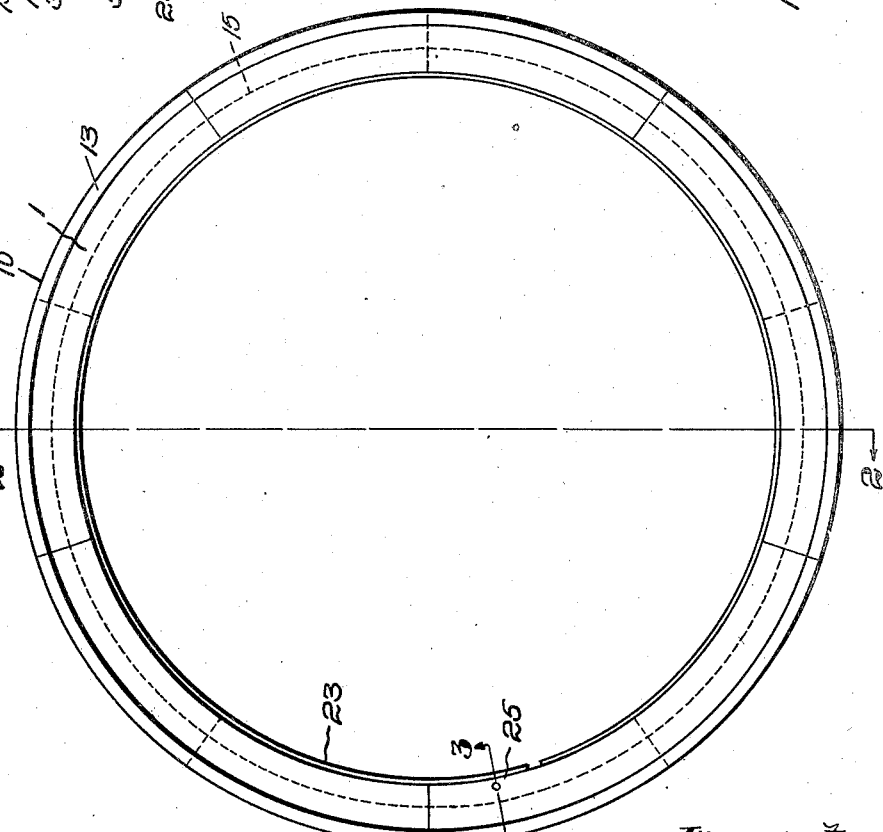
Inventor:
William H. Longabaugh
by Emery Booth Townsend Miller + Weidner
Attys.

Patented Feb. 20, 1940

2,191,023

UNITED STATES PATENT OFFICE 2,191,023

PISTON RING

William H. Longabaugh, Baltimore, Md., assignor to Revere Copper and Brass Incorporated, Rome, N. Y., a corporation of Maryland Application June 16, 1937, Serial No. 148,537

7 Claims. (Cl. 309—28)

My invention relates to piston rings, particularly, but not exclusively, those for locomotive and marine engines and other engines or pumps having cylinder bores of large diameter.

The invention has among its objects the provision of an improved segmental ring in which the segments will be held in assembled relation and the ring expanded radially against the cylinder walls and laterally against the opposite walls of the ring groove in the piston, the rings being especially applicable in situations where the cylinder is not truly cylindrical, and the invention particularly lending itself to the use of rings formed of copper-base alloys or other metals subject to breakage.

The invention will be best understood from the following description when read in the light of the accompanying drawing of an embodiment of the invention, while the scope of the invention will be more particularly pointed out in the appended claims.

In the drawing:

Fig. 1 is a plan of a ring constructed according to the invention;

Fig. 2 is a section on the line 2—2 of Fig. 1;

Fig. 3 is a section on the line 3—3 of Fig. 1; and

Fig. 4 is a fragment of a radial section of a cylinder and cooperating piston having the improved piston rings.

Referring to the drawing, the ring illustrated is formed of a plurality of elongated arcuate segments 1 arranged side by side and end to end to form a pair of annuli having contacting sides 3, the remote sides 5 of the annuli fitting the opposite side walls 7 of the ring groove formed in the piston 9, and the outer circumferential faces 10 of the annuli contacting with the interior walls 11 of the cylinder. As shown, the portions of the segments projecting from the ring groove in the piston are formed with flanges 13 to provide a more extensive surface for contact with the walls of the cylinder.

As illustrated, the lower portions of the contacting sides 3 of the segments are formed with grooves or recesses 15 extending throughout the lengths of the segments so as to form in the assembled ring a circumferential groove or recess extending inwardly from the inner periphery of the ring. The segments shown are so formed that the side walls 17 of this circumferential groove diverge as they extend inwardly from the inner circumference of the ring toward its outer circumference.

For expanding the ring radially to cause it to seat on the walls of the cylinder, and for expanding it laterally to cause its opposite sides 5 to contact with the opposite side walls 7 of the ring groove, is provided a split spring ring having, in radial cross-section, a U-shaped portion 19, the legs 21 of which portion converge as they extend away from the bend of the U. At the ends of the legs 21 opposite the bend of the U the ring is formed to provide flanges 23 which contact with the inner peripheral faces of the segments. Owing to the flanges 23 engaging the inner peripheral faces of the segments the split spring ring acts to expand the ring radially; and the U-shaped portion 19 of the split spring ring, being under compression when the ring is assembled with the piston, tends to force the two annuli away from each other so as to expand the ring laterally. It will also be observed that when the ring is assembled with the piston, as illustrated in Fig. 4, the U-shaped portion of the spring holds the segments in assembled relation, so that if one should break the broken portion would still be held in the ring groove in the piston.

The ring may be assembled with the piston by placing the split spring ring in the ring groove and then snapping the segments into the ring groove into engagement with the U-shaped portion of the spring ring. Preferably an opposite pair of the segments are positively united to the spring ring in any convenient manner before the piston ring is placed in the ring groove so as to prevent the two annuli from rotating relative to each other. This may be done, for example, by inserting a pin 25 in aligned perforations formed in these pairs of segments and the spring ring. After the spring ring and these segments are inserted in the ring groove the remaining segments may be snapped into the ring groove into engagement with the U-shaped portion of the spring ring. However, if desired, and especially when a laterally stiff spring ring is employed, the segments may be assembled with the spring ring before entering the ring in the ring groove and the assembled ring be sprung into the ring groove in the usual manner.

The segments preferably are made by extruding a copper-base alloy to form rods having the cross-section of the segments, and then bending lengths of these rods to curvilinear shape to form the segments, after which the ends of the segments are finished. It will be noted that the cross-section of the segments is such as readily to permit this method of fabrication. If desired, however, the segments may be forged from rolled, or extruded, round rods, or they may be cut and turned from elongated cast sleeves.

It will be understood that within the scope of the appended claims wide deviations may be made from the form of the invention described without departing from the spirit of the invention.

I claim:

1. A piston ring having, in combination, segmental elements arranged side by side and end to end to form a pair of opposed annuli, the adjacent faces of the several segmental elements of each annulus being formed with recesses which in the assembled ring cooperate to form a groove having reentrant side walls opening on the inner periphery of the ring, and a laterally expandible ring member in said groove cooperating with and retained in said groove by the reentrant side walls thereof and acting to urge said annuli laterally away from each other, which ring member is also expandable radially of the ring, said ring member and segmental elements having cooperating engaging transverse portions for causing said member to expand the ring radially.

2. A ring according to claim 1 in which the laterally and radially expandible member is formed with oppositely extending flange portions at the exterior of the groove formed by the recesses in the segmental elements, which flange portions engage with the inner peripheral face portions of the segmental elements.

3. The combination with a piston having a piston ring groove, of segmental rings in said piston ring groove, the facing sides of said rings each being formed with a groove which laterally of the ring has a reentrant side, a laterally and radially resilient ring having side portions received in said grooves of said segmental rings for expanding said segmental rings radially and for urging them laterally away from each other against abutments operatively provided by the lateral sides of said piston ring groove, said side portions of said laterally and radially resilient ring being shaped to cooperate with the reentrant sides of said grooves in said segmental rings for holding them and their segments in assembled relation in said piston ring groove.

4. A piston ring having, in combination, segmental elements arranged side by side and end to end to form a pair of contiguous annuli, the adjacent faces of the several segmental elements of each annuli being formed with recesses which in the assembled ring cooperate to form a groove having reentrant side walls opening on the inner periphery of the ring, a ring member in said groove cooperating with and retained in said groove by the reentrant side walls thereof, said ring member being radially expansible, and said ring member and segmental elements having cooperating engaging transverse portions at the exterior of said groove for expanding said ring radially.

5. A piston ring having, in combination, segmental elements arranged side by side and end to end to form a pair of opposed annuli; the opposed sides of said elements being formed with complementary recesses presenting, in the assembled ring, a groove which opens on an inner peripheral surface of the ring and has opposite side walls which diverge from the inner toward the outer periphery of the ring; and a laterally expandible means in said groove engaging with the side walls thereof for holding said segmental elements in assembled relation when the ring is assembled in a piston ring groove and for expanding the ring laterally, said means also being expandible radially of the ring, said means and segmental elements having cooperating engaging transverse portions for causing said means to expand the ring radially.

6. A ring according to claim 5 in which the body portion of the laterally and radially expandible means is generally U-shaped in cross-section diametrically of the ring with the opposite legs of the U converging toward each other as they extend toward the open end of the U, which open end faces the open end of the groove formed by the recesses in the segmental elements when said groove is viewed in cross-section diametrically of the ring, said opposite legs of the U engaging with the opposite side walls of said groove.

7. A ring according to claim 5 in which the body portion of the laterally and radially expandible means is generally U-shaped in cross-section diametrically of the ring with the opposite legs of the U converging toward each other as they extend toward the open end of the U, which open end faces the open end of the groove formed by the recesses in the segmental elements when said groove is viewed in cross-section diametrically of the ring, said opposite legs of the U engaging with the opposite side walls of said groove, and in which the segmental elements have surfaces which face the axis of the ring and the legs of said U have laterally extending portions engaging said surfaces.

WILLIAM H. LONGABAUGH.